United States Patent [19]

Cote et al.

[11] Patent Number: 5,101,543
[45] Date of Patent: Apr. 7, 1992

[54] METHOD OF MAKING A VARIABLE CAPACITOR MICROPHONE

[75] Inventors: Paul L. Cote, Windham, N.H.; Robert A. Sallavanti, Dalton, Pa.

[73] Assignee: Gentex Corporation, Carbondale, Pa.

[21] Appl. No.: 647,761

[22] Filed: Jan. 30, 1991

Related U.S. Application Data

[62] Division of Ser. No. 535,897, Jul. 2, 1990, abandoned.

[51] Int. Cl.$^5$ ............................................. H01G 5/16
[52] U.S. Cl. ..................................... 29/25.41; 29/594; 29/631.1; 381/191
[58] Field of Search ............... 29/631.1, 592.1, 25.41, 29/594; 204/164, 165, 169; 381/173, 174, 191

[56] References Cited

U.S. PATENT DOCUMENTS

| | | | |
|---|---|---|---|
| 2,723,349 | 11/1955 | Rylsky | 36/231 |
| 4,397,702 | 8/1983 | Klein et al. | 29/631.1 |
| 4,429,191 | 1/1984 | Busch-Vishniac et al. | 29/631.1 |
| 4,730,283 | 3/1988 | Carlson et al. | 381/191 X |
| 4,764,690 | 8/1988 | Murphy et al. | 29/594 X |

Primary Examiner—Carl E. Hall
Attorney, Agent, or Firm—Shenier & O'Connor

[57] ABSTRACT

A method of making a variable capacitor microphone in which the fixed capacitor element is formed by first coating the metallized surface of a relatively rigid insulating substrate with a polarizable dielectric material and then placing the substrate on one of a pair of spaced electrodes positioned in an ionizable gas and subjecting the gas to the action of alpha rays to produce ions in the space between the electrodes while applying a potential across the electrodes to cause ions to migrate toward the dielectric material to polarize the same to form an electret. After the fixed capacitor element has thus been formed, it is mounted in spaced relationship to a flexible diaphragm to form a microphone.

6 Claims, 4 Drawing Sheets

METHOD OF MAKING A VARIABLE CAPACITOR MICROPHONE

This application is a division of our copending application, Ser. No. 07/535,897 filed July 2, 1990, now abandoned.

BACKGROUND OF THE INVENTION

The invention relates to a method of making a variable capacitor microphone and to a microphone made by the method.

Capacitor microphones in which a permanently polarized dielectric, or electret, is used to obviate the need for an external high-voltage supply are well known in the art. Because of their small size, relative insensitivity to temperature or humidity changes, and extended high-frequency response, they are especially suited for use in citizen's-band transceivers, military communications systems and the like. One such electric microphone is shown in Cote U.S. Pat. No. 4,443,666, owned by the assignee herein.

In the microphone shown in the above-identified patent, an insulating substrate carries a metal electrode which in turn supports an electret. The electret comprises a fluorocarbon polymer such as the one sold by E. I. du Pont de Nemours and Company under the trademark TEFLON. A diaphragm comprising a metallized polyester such as the one sold under the trademark MYLAR, disposed at a spacing from the electret, serves as a second electrode. Vibration of the second electrode in response to acoustic vibrations gives rise to a corresponding variation in the instantaneous displacement between the two electrodes, producing in turn a momentary variation in the potential difference between the two electrodes. This potential variation is applied to the gate of a field-effect transistor (FET) carried on the other side of the substrate, which in turn is coupled to an external amplification system.

In the fabrication process conventionally used, individual electrets of the desired shape are cut from a previously polarized sheet of TEFLON or other fluorocarbon polymer and bonded to the electrode carried by the substrate, following which the other elements of the electret microphone are assembled. It has been found that electrets made by this conventional process tend to discharge after a relatively short period of time, especially in moist environments. While the exact explanation of this premature discharge is not known, it is believed that the repeated handling of the electret following its initial formation is a contributing factor.

Another problem experienced with this conventional fabrication process is the tendency of the electret not to adhere to the electrode to which it is applied.

Still another problem experienced with the conventional fabrication process involves the polarization of the dielectric layer. One common method of polarizing the dielectric entails the use of a corona to ionize a gaseous region adjacent to the layer to generate charged particles. Although coronas generate the desired charged particles, they also undesirably generate ozone.

SUMMARY OF THE INVENTION

One of the objects of our invention is to provide a method of making a variable capacitor microphone comprising that maintains its polarization after a long period of time, even in moist environments.

Another object of out invention is to provide a variable capacitor microphone comprising an electret that satisfactorily adheres to a substrate to which it is applied.

Other and further objects will be apparent from the following description.

Our invention contemplates a method of making a variable capacitor microphone in which the fixed capacitor element is formed by first coating the metallized surface of a relatively rigid insulating substrate with a polarizable dielectric material which preferably is a fluorocarbon and more particularly a fluorinated ethylene-prophylene copolymer such as the one sold under the trademark TEFLON.

The coating is preferably applied to a plurality of conductive supports carried by a single substrate, preferably by spraying through a mask. Next, the dielectric carried by the substrate is permanently polarized. More particularly, a pair of electrodes, one of which preferably supports the substrate carrying the dielectric and is heated, define a region therebetween capable of containing an ionizable gas such as air. The region is exposed to alpha radiation to generate charged particles of a given polarity from the gas, and a potential is applied to the electrodes to effect electrostatic deposition of the particles on a dielectric disposed in the region. Preferably, the alpha radiation source, which may comprise polonium 210 as noted above, is disposed relatively adjacent to the charging electrode and is shielded from the heating source.

We have found that by using an alpha source such as polonium 210 as an ion generator, we can effectively polarize dielectrics to form electrets. At the same time, by avoiding the use of a corona generator with its attendant high-intensity field, we avoid the undesirable result of generating ozone.

We have found that by forming the dielectric layer in situ in the manner described above on the surface of the conductive support, we ensure satisfactory adhesion between the dielectric and the support. Further, since the dielectric layer is polarized only after it has been formed on the conductive support, subsequent handling of the dielectric, which may result in charge dissipation, is minimized. After the insulating substrates carrying the electret to form six capacitor elements have been formed in the manner described, they are mounted in spaced relationship to flexible diaphragms to form the variable capacitor microphones.

BRIEF DESCRIPTION OF THE DRAWINGS

In the accompanying drawings to which reference is made in the instant specification and which are to be read in conjunction therewith and in which like reference numerals are used to indicate like parts in the various views.

DESCRIPTION OF THE PREFERRED EMBODIMENT

Figure 1:
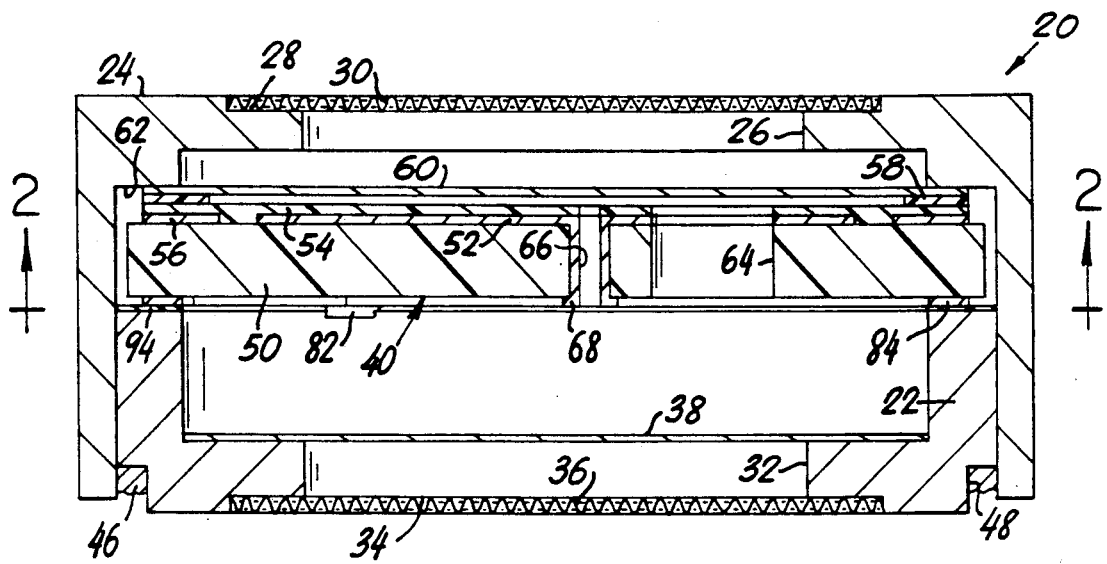
FIG. 1 is a section along line 1—1 of FIG. 2 of a microphone incorporating an electret constructed in accordance with our invention.

Referring to FIGS. 1 to 4, a microphone 20 incorporating an electret constructed in accordance with our invention includes a conductive base or lower housing portion 22 and a conductive cap or upper housing portion 24 which fits over the base 22 in intimate sliding contact therewith as shown in FIG. 1 to form a conductive housing. Cap 24 is formed with a port 26 and with a larger-diameter recess 28 on the outer side of the port for receiving a wire screen 30. Likewise, base 22 is formed with a port 32 and with a larger-diameter recess 34 on the outer side of the port for receiving a wire screen 36. If desired, the inner side of port 32 may be fitted with an acoustically transparent shield 38 to protect the components to be described from moisture. A circuit board 40 includes a circular portion, supported by the upper rim of base 22 inside the housing, and a rectangular exposed portion or tab 42, which extends out of the housing through a slot 44 formed in the sidewall of cap 24. A nonconductive outer epoxy seal 46 extends along the lower edge of cap 24 and along the interface between tab 42 and base 22. Preferably, base 22 is formed with an indentation 48 around its lower periphery to accommodate the epoxy seal 46.

Figure 3:
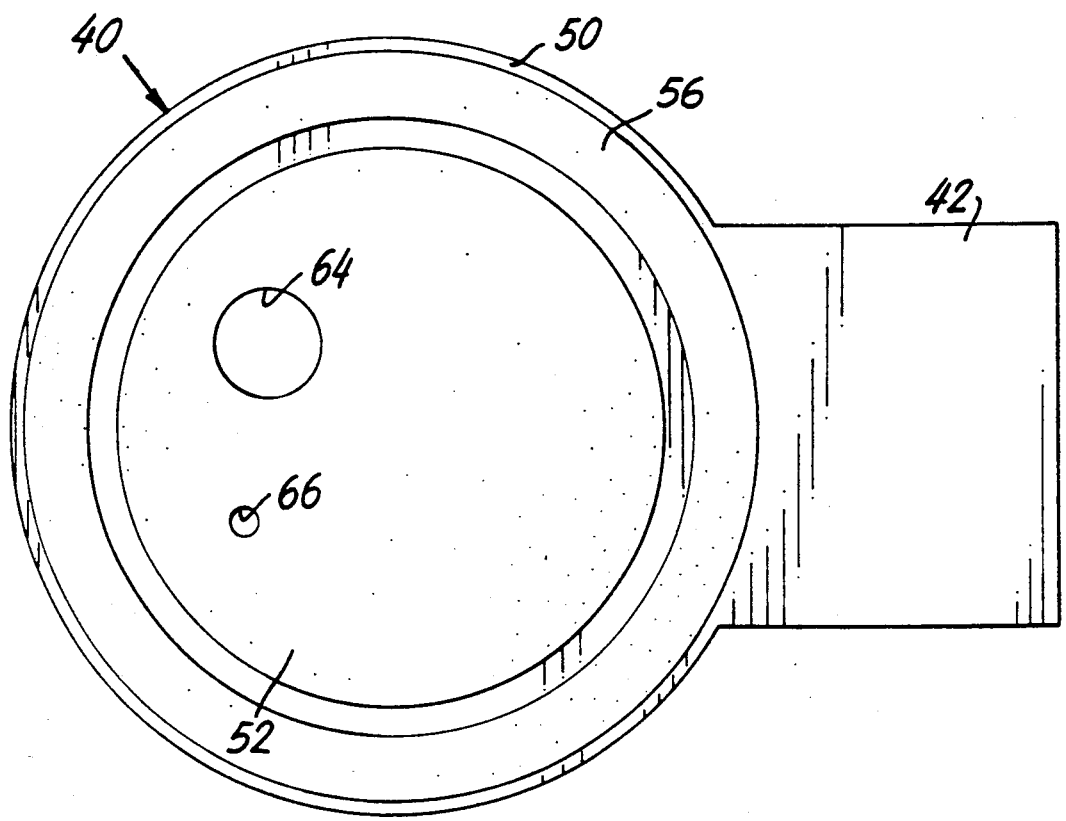
FIG. 3 is a top plan of the circuit board of the microphone shown in FIG. 1 as it looks before the electret is formed thereon.

Circuit board 40, which supports the transducer and electronic elements of the microphone 20, is formed from an insulating ceramic support 50 having a circular palladium-silver electrode 52 formed on the upper surface of the enclosed portion of the board, as shown in FIG. 3. A permanently polarized disk-shaped electret 54 (not shown in FIG. 3) is formed on the upper surface of the electrode 52 in accordance with our invention, as described below. A concentric palladium-silver support ring 56 surrounding electrode 52 on the upper surface of the board 40 supports the periphery of the electret 54. Electret 54 in turn supports an annular spacer 58, preferably comprising a polyester material such as the one sold under the trademark MYLAR. Spacer 58 in turn has bonded thereto a diaphragm 60 also comprising a polyester such as MYLAR and having a gold plating (not separately shown) on its upper surface as viewed in FIG. 1. Electrode 52, electret 54, spacer 58 and diaphragm 60 together constitute the transducer portion of the microphone 20. An annual shoulder 62 formed on the inner surface of cap 24 presses the diaphragm 60 and spacer 58 against electret 54 and support ring 56 to sandwich the board 40 between the upper rim of base 22 and spacer 58.

Board 40 is formed with a first, relatively large-diameter bore 64 to form an acoustic coupling between the two sides of the board. In addition, board 40 is formed with a smaller-diameter bore 66, which is plated through with palladium-silver to provide an electrical coupling between electrode 52 and a palladium-silver plated area 68 on the lower side of board 40 adjoining a gold plated area 70. Plated area 70 is connected to the gate electrode of a field-effect transistor (FET) 72 carried on the lower surface of board 40. FET 72 has its source electrode coupled to a gold plated area 74 adjoining a palladium-silver plated area 76 and has its drain electrode coupled to a gold plated area 78 adjoining a palladium-silver plated area 80 also formed on the lower surface of board 40. A gate resistor 82 provides a conductive path between plated area 68 and a peripheral palladium-silver plated area 84 formed on the lower surface of board 40, while a source resistor 86 couples plated area 76 to the same peripheral area 84.

Figure 4:
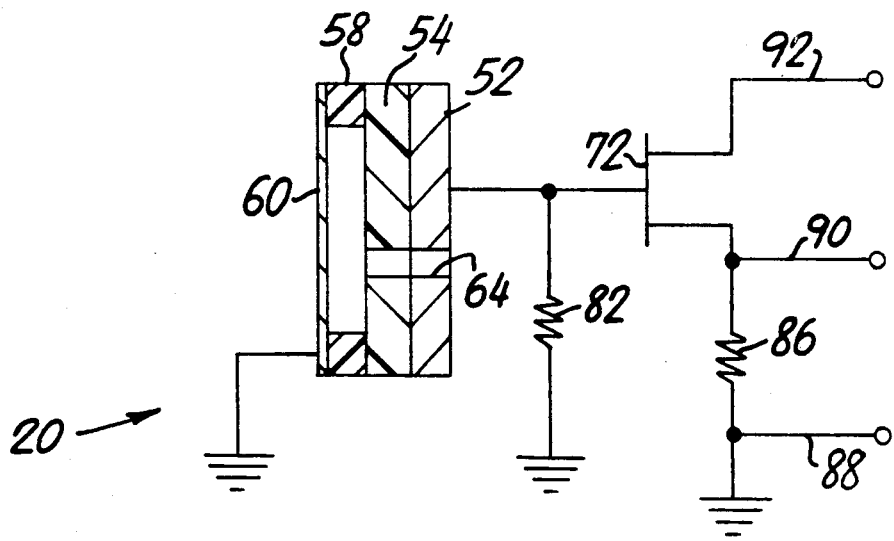
FIG. 4 is a schematic diagram of the electret microphone of FIG. 1 and the preamplifier circuit associated therewith.

A first electrical terminal or contact 88 formed on the lower surface of tab 42 extends inwardly through slot 44 to join plated area 84. A second electrical terminal 90 formed on the lower surface of tab 42 extends through slot 44 to join plated area 76, while a third terminal 92 formed on the lower surface of tab 42 extends inwardly through slot 44 to join plated area 80. Preferably, terminals 88, 90 and 92 are formed of the same material as the plated areas that they join. A conductive epoxy layer 94 generally coextensive with annular plated area 84 couples area 84 electrically to base 22 and hence cap 24 to allow area 84 to serve as a ground or common line. Terminal 92 provides an external connection to the common plated area 84, while terminals 90 and 92 provide external connections to the source and drain, respectively, of FET 72, as shown in FIG. 4. A nonconductive epoxy layer 96 separates the inwardly extending portions of terminals 90 and 92 from the upper rim of base 22 to preclude the possibility of a short circuit.

Suitable values for the mechanical dimensions, electrical parameters and the like will be apparent to those skilled in the art. Satisfactory results have been obtained with the following choices:

| | |
|---|---|
| Substrate (50) thickness | 0.020 inch |
| Substrate (50) diameter | 0.285 inch |
| Tab (42) width | 0.148 inch |
| Tab (42) length | 0.125 inch |
| Electrode (52) diameter | 0.200 inch |
| Ring (56) ID | 0.225 inch |
| Ring (56) OD | 0.275 inch |
| Acoustic bore (64) diameter | 0.041 inch |
| Electric bore (66) diameter | 0.010 inch |
| Plating thickness | 0.0005 inch |
| Diaphragm (60) thickness | 0.00025 inch |
| Spacer (58) thickness | 0.002–0.003 inch |
| Source resistor (86) | 4.7–10 k$\Omega$ |
| Gate resistor (82) | 1000 M$\Omega$ |
| FET (72) | 2N4338 |
| Screen (30, 36) mesh size | 5 $\mu$m |

Figure 5:
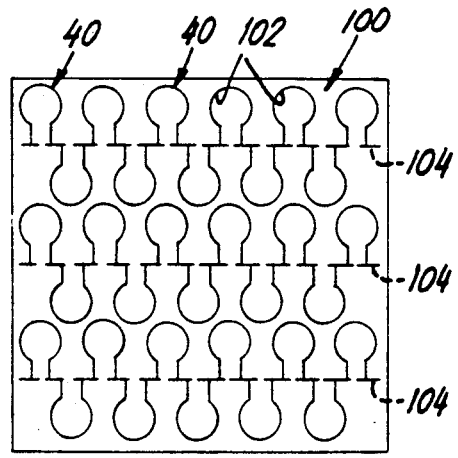
FIG. 5 is a top plan of the substrate from which the individual circuit boards are formed.
Figure 6:
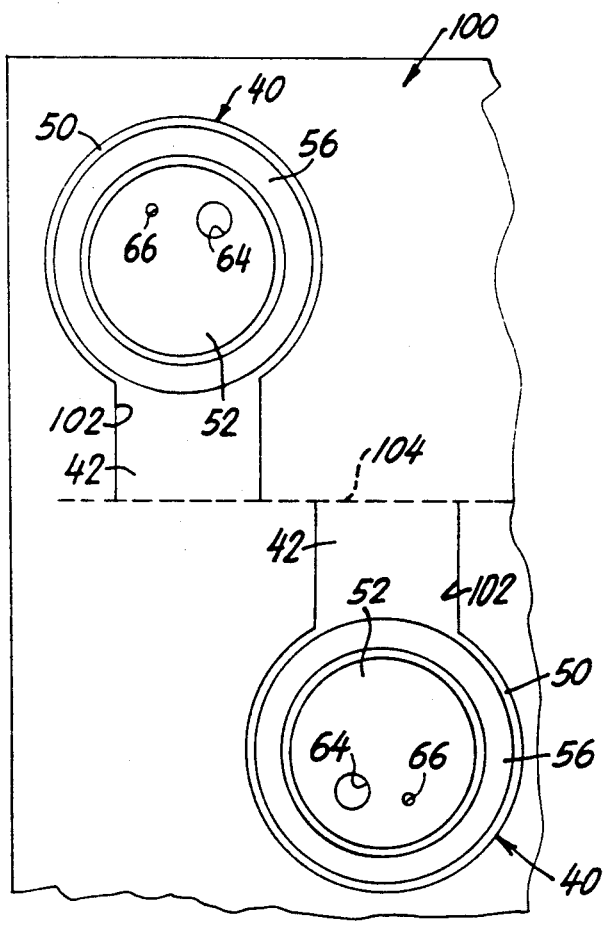
FIG. 6 is an enlarged fragmentary top plan of the upper left portion of the substrate shown in FIG. 5.

Referring now to FIGS. 5 and 6, a plurality of circuit boards 40 are formed from a single wafer 100, in which the circular portions of the boards and the sides of the tabs 42 are defined by laser cuts 102. The individual boards 40 are so arranged on the wafer 100 that the ends of the tabs 42 lie along lines 104 defined by scribes formed on the lower surface of the wafer 100. Typically, wafer 100 may be about 2.5 inches square and contain 33 individual boards 40.

Figure 2:
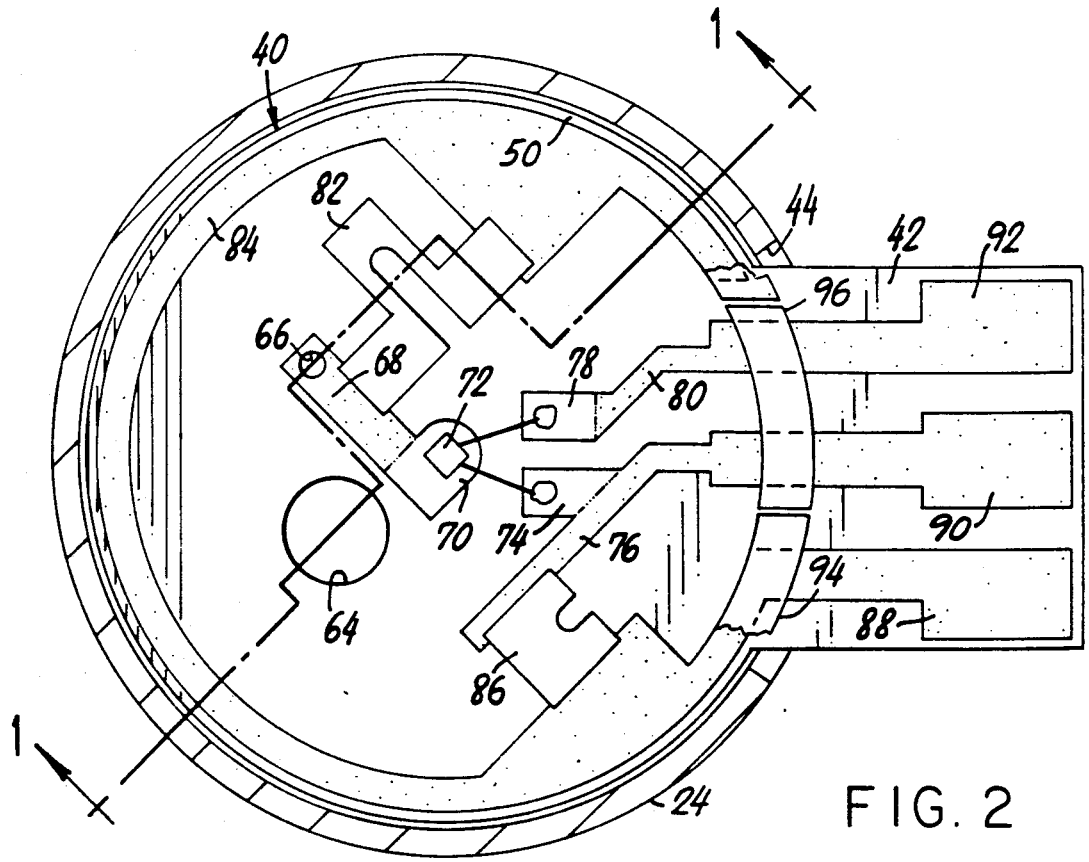
FIG. 2 is a section of the electret microphone of FIG. 1 along line 2—2 thereof.

To form circuit boards 40 containing electrets 54, a ceramic wafer 100 is first drilled to form the bores 64 and 66 of the individual boards, and formed with laser cuts 102 and scribe lines 104 to permit the individual boards 40 to be snapped away from the remainder of the wafer along the scribe lines. The upper and lower surfaces of the individual boards 40 on the wafer 100 are then plated with areas of palladium-silver and gold, as described above. After this plating step, gate resistor 82 and source resistor 86 are screened onto the lower surfaces of the boards, as shown in FIG. 2.

Figure 7:
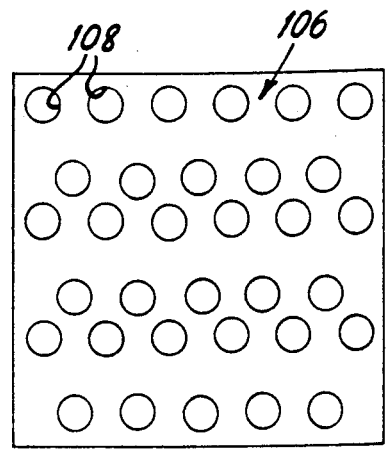
FIG. 7 is a top plan of the mask used while spraying the dielectric onto the substrate shown in FIG. 5.
Figure 8:
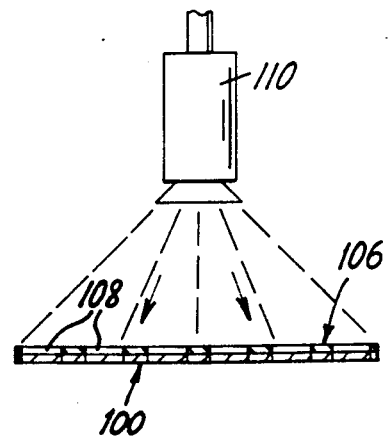
FIG. 8 is a section showing the spraying of the dielectric onto the surface of the substrate.

Next, the TEFLON fluorocarbon dielectric is applied to the front surface of each of the individual circuit boards 40 by using an applicator 110 to spray the upper surface of the wafer 100 through a mask 106. As shown in FIGS. 7 and 8, mask 106, which rests on the surface of the wafer 100 during spraying, comprises a flat metal (e.g., brass) stencil formed with a plurality of apertures 108 concentric with and corresponding in diameter to the outside diameter of rings 56. Apertures 106 may be formed by any suitable process such as chemical etching. Preferably, DuPont 856-200 TEFLON FEP clear coating, an aqueous solution of FEP (fluorinated ethylene-propylene copolymer) having a viscosity of 25-300 centipoise (cP), is used. Preferably, no primer is used, and the solution not diluted. Before being applied, the material is preferably gently agitated at room temperature by rolling its container for 15 to 30 minutes, and then filtered through a 100 mesh stainless steel screen. Applicator 110 may comprise a standard compressed-air spray gun of the type used in painting. One suitable spray gun is a DeVilbiss Model MBC, operating at a pressure of 40 psi, with a #30 air cap with an F tip. The thickness of the applied dielectric layer 54 is controlled by the number of coatings. Preferably, no more than 1 mil of coating is formed per application.

After each coat of dielectric is applied in this manner to the front surface of wafer 100, it is thermally cured in accordance with the manufacturer's specifications to evaporate the solvent. Satisfactory results have been obtained with a total coating thickness of 1.5 mils, each coat being baked for 1 hour at 700° F. After the desired number of layers of dielectric have been applied in this manner, FETs 72 are applied to the lower surfaces of the individual boards 40, their leads bonded to gold-plated areas 70, 74 and 78, and the FETs potted over with epoxy (not shown). The individual boards are then separated from the wafer, as a preliminary to the charging step to be described below, by snapping them off at the ends of the tabs 42 along scribe lines 104.

Figure 9:
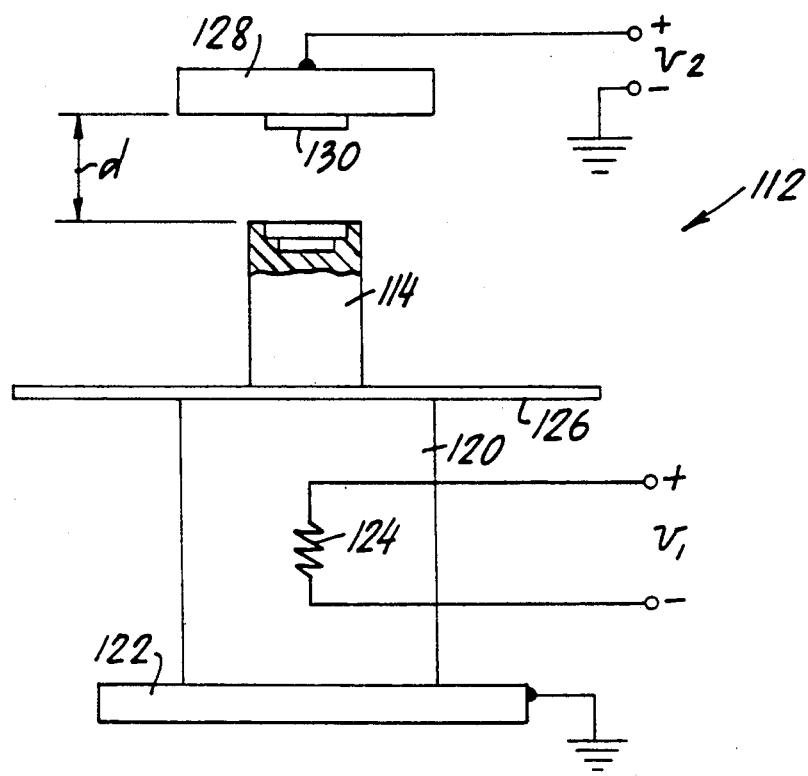
FIG. 9 is a partly schematic side elevation of the apparatus used for permanently polarizing the dielectric formed by the spraying process as shown in FIG. 8.
Figure 10:
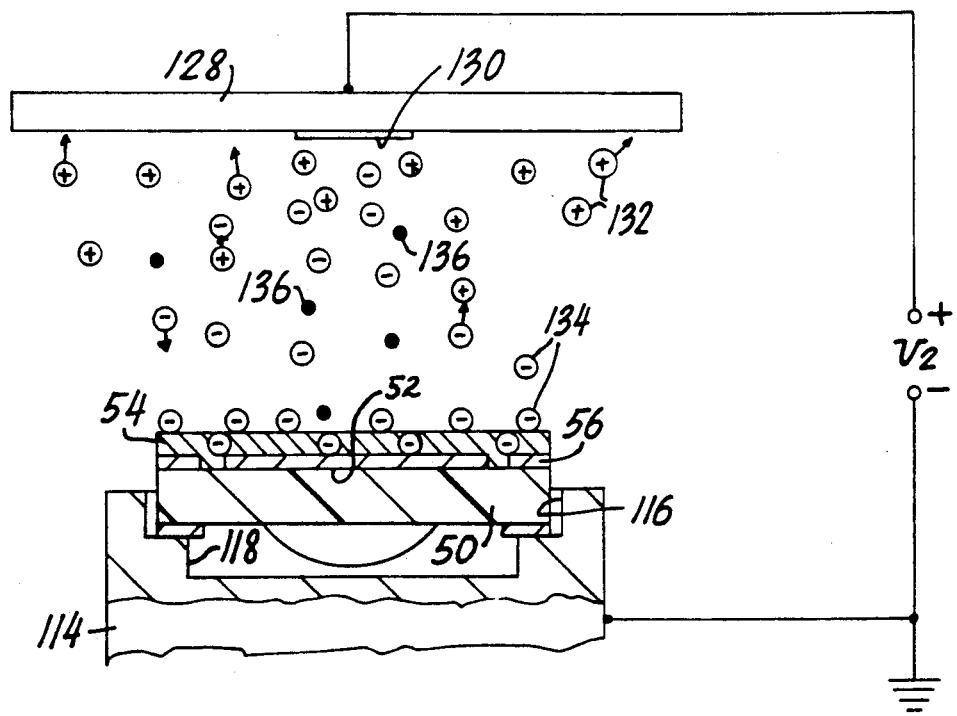
FIG. 10 is a partly schematic fragmentary enlarged side elevation of the apparatus shown in FIG. 9.

Referring now to FIGS. 9 and 10, the charging apparatus, indicated generally by the reference numeral 112, includes a conductive support 114, the upper surface of which is formed with a well 116 for receiving an individual circuit board 40 with the lower surface thereof face down. As shown in FIG. 10, well 116 is formed with a further recess 118 to accommodate the electronic components on the lower surface of the board 40. Support 114 rests on a brass workstation 120, which in turn has a conductive base 122. A resistive element 124 disposed within workstation 120 is adapted to be coupled to a source of potential $v_1$ to heat the circuit board 40 to a suitable temperature during the charging process. A heat shield 126 disposed between support 114 and workstation 120 shields the electrode to be described from heat from the workstation 120.

Conductive support 114 not only supports circuit board 40, but serves as a first electrode, to which the electrode 52 supporting the electret 54 is coupled through the electronic components on the lower surface of the board. A charging electrode 128 disposed at a predetermined distance d from support 114 is adapted to be coupled to a source of highly negative potential $v_2$ to create a potential gradient in the region between electrode 128 and support 114. Preferably, electrode 128 comprises a metal (e.g., brass) disk supported by suitable means (not shown) for pivotal movement between an operative position (FIGS. 9 and 10) in register with workstation 120 and support 114, with a breach or gap of width d, and an inoperative position out of register with support 114. An ion generator 130 secured to the lower surface of electrode 128 ionizes the air in the region adjacent electrode 128, generating charged particles including positive ions 132, negative ions 134 and electrons 136. Preferably, ion generator 130 comprises an alpha emitter such as polonium 210, which is a short-range, short-life material.

Since, as described above, the electrode 128 is maintained at a highly negative potential relative to support 114, positive ions 132 formed in the gap are attracted to electrode 128, while negative ions 134 and electrons 136 are attracted toward the support 114 and hence dielectric layer 54. Those electrons and negative ions that reach the dielectric 54 without recombining with positive ions impinge upon the surface of the dielectric layer 54. Owing to thermal activity in the dielectric layer 54, those electrons and negative ions are absorbed onto or into the material, producing a layer of a negative charge (not separately shown) at or adjacent to the upper surface of the dielectric layer. That charge remains when the charging electrode 128 is removed and the dielectric layer 54 cooled.

In operation, an individual circuit board 40 on which a dielectric layer 54 has been formed is placed in the well 116 of support 114 and allowed to reach a suitable temperature. The electrode 128 and ion generator 130 are then swung into position opposite the support 114 at a spacing d therefrom. The dielectric layer 54 on board 40 is then charged for a predetermined time. The electrode 128 and ion generator 130 are then removed and the board 40 quickly cooled. To verify the charge level the board 40 is placed under an electrostatic voltmeter (not shown). If the measured voltage is acceptable, the board 40 is used to assemble a microphone as shown in FIGS. 1 to 4.

The gap width d controls the rate and thus amount of charge on the surface of layer 54 for a given time, temperature and charging voltage $v_2$. Suitable choices for the charging voltage $v_2$, temperature, time and gap width d will be apparent to those skilled in the art. Satisfactory results have been obtained using a voltage $v_2$ of $-3000$ volts, a time of 20 seconds, a temperature of 175° C. and a gap width d of 0.5 inch.

Certain variations of the process described above will be apparent to those skilled in the art. Thus, while heating the dielectric during the charging step is desirable, it is not essential. Further, while the use of a mask is desirable to prevent the deposition of dielectric onto the tabs 42 of the circuit boards, such a step is likewise not essential.

It will be seen that we have accomplished the objects of our invention. Our method produces a variable capacitor microphone including an electret which maintains its polarization after a long period of time, even in moist environments, and satisfactorily adheres to a substrate to which it is applied. Further, the disclosed process for making an electret does not result in the generation of ozone.

It will be understood that certain features and subcombinations are of utility and may be employed without reference to other features and combinations. This is contemplated by and within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A method of making a variable capacitor microphone having a fixed capacitor element comprising a rigid insulating substrate with a metalized surface including the steps of forming the fixed capacitor element by successively coating the metalized surface of said substrate with polarizable dielectric material, placing the substrate on one of a pair of spaced electrodes positioned in an ionizable gas, subjecting said gas to the action of alpha rays to produce ions in the space between said electrodes, applying a potential across the electrodes to cause ions to migrate toward said dielectric material to polarize the same to form an electret thereof, and mounting said insulating substrate carrying said electret in spaced relationship to a flexible diaphragm to form said microphone.

2. A method as in claim 1 in which said coating steps comprises applying to said metalized surface fluorinated ethylene-propylene copolymer in a solvent.

3. A method as in claim 2 in which said solvent is water.

4. A method as in claim 3 including the step of applying an active circuit element of said substrate following the application of said coating.

5. A method of forming a plurality of variable capacitor microphones including the steps of dividing a wafer of relatively rigid insulating material into a plurality of separable circuit boards, simultaneously forming a film of conductive material on said circuit boards, simultaneously coating areas of said film of conductive material with a polarizable dielectric, separating said circuit boards, individually placing said circuit boards on one of a pair of spaced electrodes positioned in an ionizing gas, subjecting said gas to the action of alpha rays to produce ions in the space between said electrodes, applying a potential across said electrodes to cause ions to migrate toward said dielectric material to polarize the same to form fixed electret capacitor elements thereof and mounting said fixed electret capacitor elements in spaced relationship to flexible diaphragms to form said variable capacitor microphones.

6. A method as in claim 5 in which the coating step comprises applying said dielectric to said areas through a mask to leave uncoated regions of said film on said circuit boards.

* * * * *

UNITED STATES PATENT AND TRADEMARK OFFICE
CERTIFICATE OF CORRECTION

PATENT NO. : 5,101,543
DATED : April 7, 1992
INVENTOR(S) : Paul L. Cote and Robert A. Sallavanti It is certified that error appears in the above-identified patent and that said Letters Patent is hereby corrected as shown below:

On drawing sheet,
    the polarity of ∪ 2 in Figures 9 and 10
    should be reversed to read:   −

∩ 2

+

Signed and Sealed this

Thirteenth Day of July, 1993

*Attest:*

MICHAEL K. KIRK

*Attesting Officer*      *Acting Commissioner of Patents and Trademarks*

UNITED STATES PATENT AND TRADEMARK OFFICE
CERTIFICATE OF CORRECTION

PATENT NO.  : 5,101,543
DATED       : April 7, 1992
INVENTOR(S) : PAUL L. COTE and ROBERT A. SALLAVANTI It is certified that error appears in the above-identified patent and that said Letters Patent is hereby corrected as shown below:

Column 8, line 2 - delete "of" and insert -- to --.

Signed and Sealed this

Twenty-first Day of September, 1993

Attest:

BRUCE LEHMAN

*Attesting Officer*          *Commissioner of Patents and Trademarks*